United States Patent [19]
Lin

[11] Patent Number: 5,829,341
[45] Date of Patent: Nov. 3, 1998

[54] AUTOMATIC COOKER HAVING A CARD-TYPE CONTROLLER FOR CONTROLLING COOKING CONDITIONS ACCORDING TO COOKING DATA STORED IN A REMOVABLE CONTROL CARD

[76] Inventor: Jenny Lin, No. 227, Nan-Yang-Hsin Tsun, Nan-Yang Rd., Feng-Yuan City, Taichung Hsien, Taiwan

[21] Appl. No.: 81,628

[22] Filed: May 19, 1998

[51] Int. Cl.[6] .............................. A47J 27/00; A47J 37/01; H05B 1/02; H05B 6/68
[52] U.S. Cl. ................................. 99/326; 99/344; 99/348; 99/468; 219/400; 219/492; 219/497; 364/400; 366/146; 366/314; 366/601
[58] Field of Search .............................. 99/348, 468, 486, 99/325–333, 342–344; 219/492, 497, 400, 501, 507, 506, 704, 720, 679; 364/400, 228, 229.1, 232.3, 528.03, 528.35, DIG. 1; 395/674, 728; 426/523, 231; 366/98, 144–146, 314, 601

[56] References Cited

U.S. PATENT DOCUMENTS

| | | | |
|---|---|---|---|
| 4,106,092 | 8/1978 | Millers, II | 364/228 |
| 4,162,520 | 7/1979 | Cook et al. | 364/DIG. 1 |
| 4,287,560 | 9/1981 | Forbes et al. | 364/228 |
| 4,836,683 | 6/1989 | Aoyama | 366/98 |
| 4,863,278 | 9/1989 | Otto | 366/601 X |
| 4,984,512 | 1/1991 | Takahashi et al. | 364/400 X |
| 5,076,153 | 12/1991 | Takahashi et al. | 99/348 X |
| 5,351,606 | 10/1994 | Matsuzaki | 99/468 X |
| 5,352,874 | 10/1994 | Gong | 219/704 |
| 5,433,139 | 7/1995 | Kitagawa et al. | 99/344 X |
| 5,435,139 | 7/1995 | Yoshida | 364/528.35 X |
| 5,528,979 | 6/1996 | Yoshida | 99/327 |
| 5,531,153 | 7/1996 | Maruyama et al. | 364/400 X |
| 5,590,585 | 1/1997 | Morishita | 99/327 |

*Primary Examiner*—Timothy F. Simone
*Attorney, Agent, or Firm*—Limbach & Limbach L.L.P.

[57] ABSTRACT

An automatic cooker is capable of cooking food according to automatic cooking data stored in a control card. The automatic cooker includes a cooking container for receiving raw food therein, a cooking implement assembly for performing at least one cooking operation on the food in the cooking container, a housing formed with a card slot for insertion of the control card, and a card-type controller mounted in the housing and connected to the cooking implement assembly. The controller receives removably the control card that is inserted from an exterior of the housing via the card slot, and reads the automatic cooking data stored in the control card so as to control operation of the cooking implement assembly in accordance with the automatic cooking data read from the control card in order to cook the food in the cooking container.

18 Claims, 3 Drawing Sheets

AUTOMATIC COOKER HAVING A CARD-TYPE CONTROLLER FOR CONTROLLING COOKING CONDITIONS ACCORDING TO COOKING DATA STORED IN A REMOVABLE CONTROL CARD

BACKGROUND OF THE INVENTION

1. Field of the Invention

The invention relates to automatic cookers, more particularly to an automatic cooker having a card-type controller for controlling cooking conditions according to automatic cooking data stored in a removable control card.

2. Description of the Related Art

Automatic cookers, such as intelligent rice cookers and microwave ovens, incorporate controllers that are programmed by the manufacturer with fixed automatic cooking data, such as cooking times and cooking temperatures, for serving a number of different dishes. Raw food is cooked in accordance with the automatic cooking data that was selected by the user with the use of a control panel to result in the desired dish. It is noted that the variety of dishes that can be cooked automatically is limited in the conventional automatic cooker since the automatic cooking data were programmed beforehand by the manufacturer. In addition, since the cooking operations are fixed for the same dish, the conventional automatic cooker serves dishes of uniform tastes that were determined beforehand by the manufacturer, regardless of the individual tastes of different users.

U.S. Pat. No. 5,352,874 discloses an apparatus for changing cooking control data of automatic cookers. When the apparatus is incorporated in an automatic cooker, the user has the option of changing the cooking conditions as defined by the selected factory preset cooking data of the automatic cooker before or during the automatic cooking operation to allow the cooker to serve dishes that suit the taste of the user, rather than dishes of uniform tastes. However, even when incorporated with the apparatus of the aforementioned patent, the automatic cooker is still unsatisfactory since the variety of dishes that can be cooked automatically thereby is limited by the number of automatic cooking data programmed beforehand by the manufacturer.

SUMMARY OF THE INVENTION

Therefore, the object of the present invention is to provide an automatic cooker having a card-type controller for controlling cooking conditions according to automatic cooking data stored in a removable control card. Since the automatic cooking data are stored in the control card, which is removable to permit replacement with another one, the variety of dishes that can be cooked automatically using the automatic cooker of this invention is increased to enhance utility of the automatic cooker. Moreover, the automatic cooking data in the control card can be programmed to suit individual tastes, thereby enabling the automatic cooker of this invention to serve dishes that suit the individual tastes of different users, rather than dishes of uniform tastes.

Accordingly, the automatic cooker of this invention cooks food based on automatic cooking data stored in a control card, and comprises a cooking container adapted to receive raw food therein, a cooking implement assembly adapted to perform at least one cooking operation on the food in the cooking container, a housing formed with a card slot that is adapted for insertion of the control card, and a card-type controller mounted in the housing and connected to the cooking implement assembly. The controller is adapted to receive removably the control card that is inserted from an exterior of the housing via the card slot, and is adapted to read the automatic cooking data stored in the control card so as to control operation of the cooking implement assembly in accordance with the automatic cooking data read from the control card in order to cook the food in the cooking container.

Preferably, the controller includes a card reader adapted to receive removably the control card and to read the automatic cooking data stored in the control card, and an implement control unit connected to the card reader and the cooking implement assembly. The implement control unit controls the operation of the cooking implement assembly in accordance with the automatic cooking data read by the card reader.

The automatic cooking data can include cooking time data and cooking temperature data. The cooking implement assembly includes a heating device mounted to the housing and connected to and controlled by the implement control unit so as to be adapted to heat the food in the cooking container to predetermined heating temperatures during predetermined time periods based on the cooking time data and the cooking temperature data read by the card reader.

The automatic cooking data can further include stirring data. The cooking implement assembly further includes a stirring device mounted to the housing. The stirring device extends into the cooking container, and is connected to and controlled by the implement control unit so as to be adapted to stir the food in the cooking container based on the stirring data read by the card reader.

Moreover, the automatic cooking data stored in the control card can include cooking data for a predetermined number of dishes. The controller further includes a dish selector mounted on the housing and connected to the card reader. The dish selector is operable to select the cooking data of one of the dishes to be read by the card reader.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
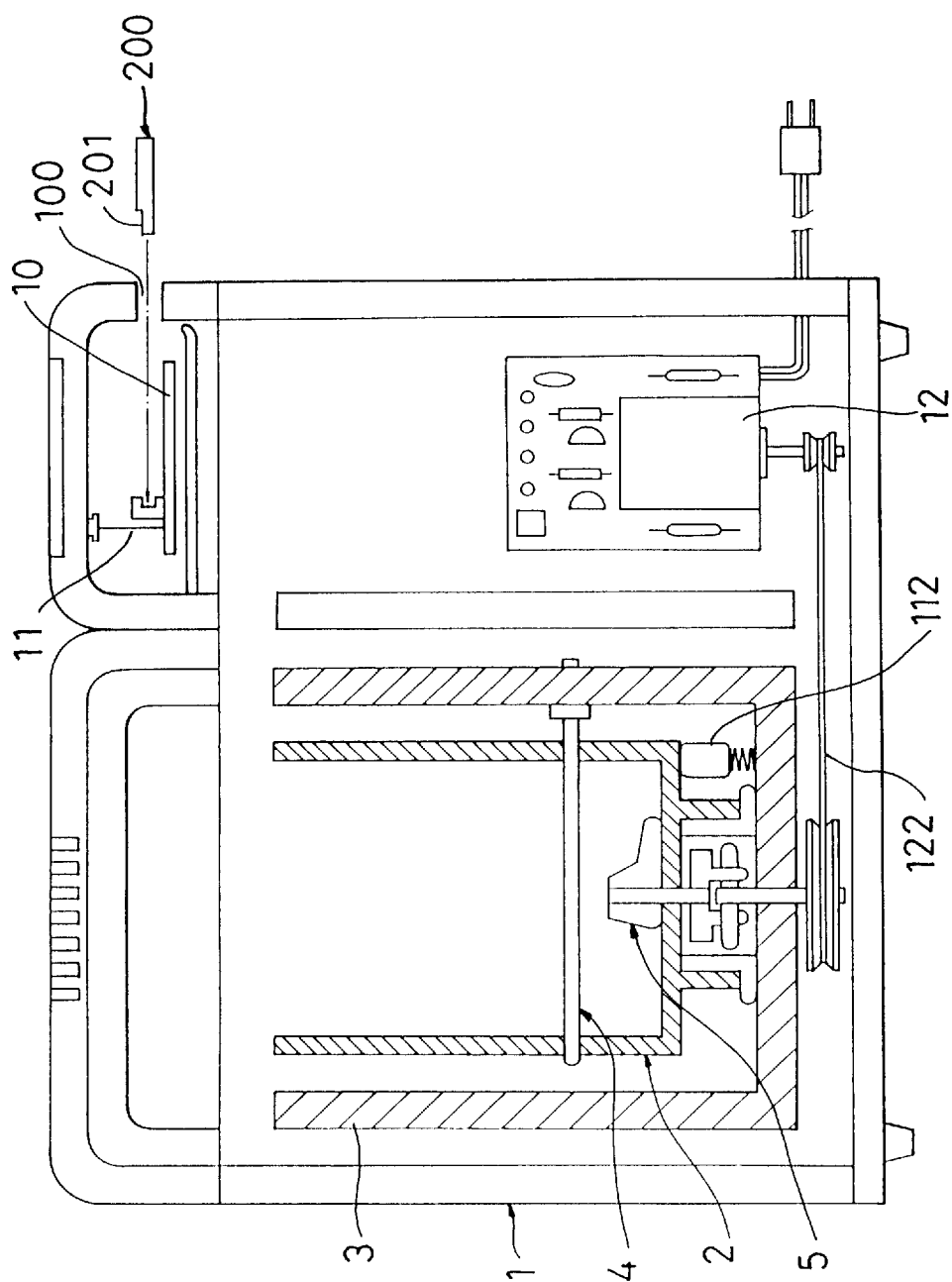
FIG. 1 is a schematic view of the preferred embodiment of an automatic cooker according to the present invention.
Figure 2:
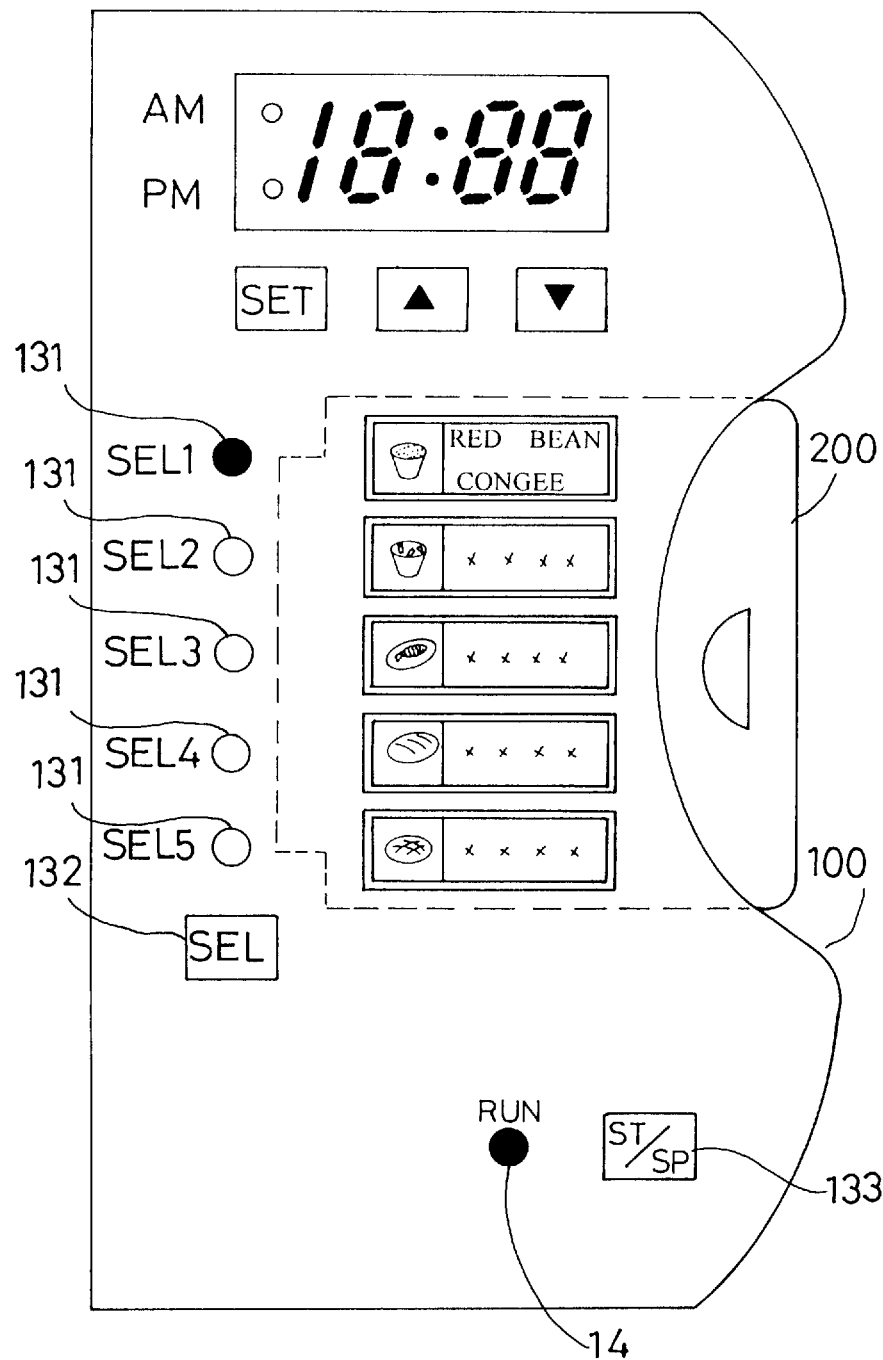
FIG. 2 is a schematic view illustrating a dish selector and a cooking status indicator of a controller of the preferred embodiment.
Figure 3:
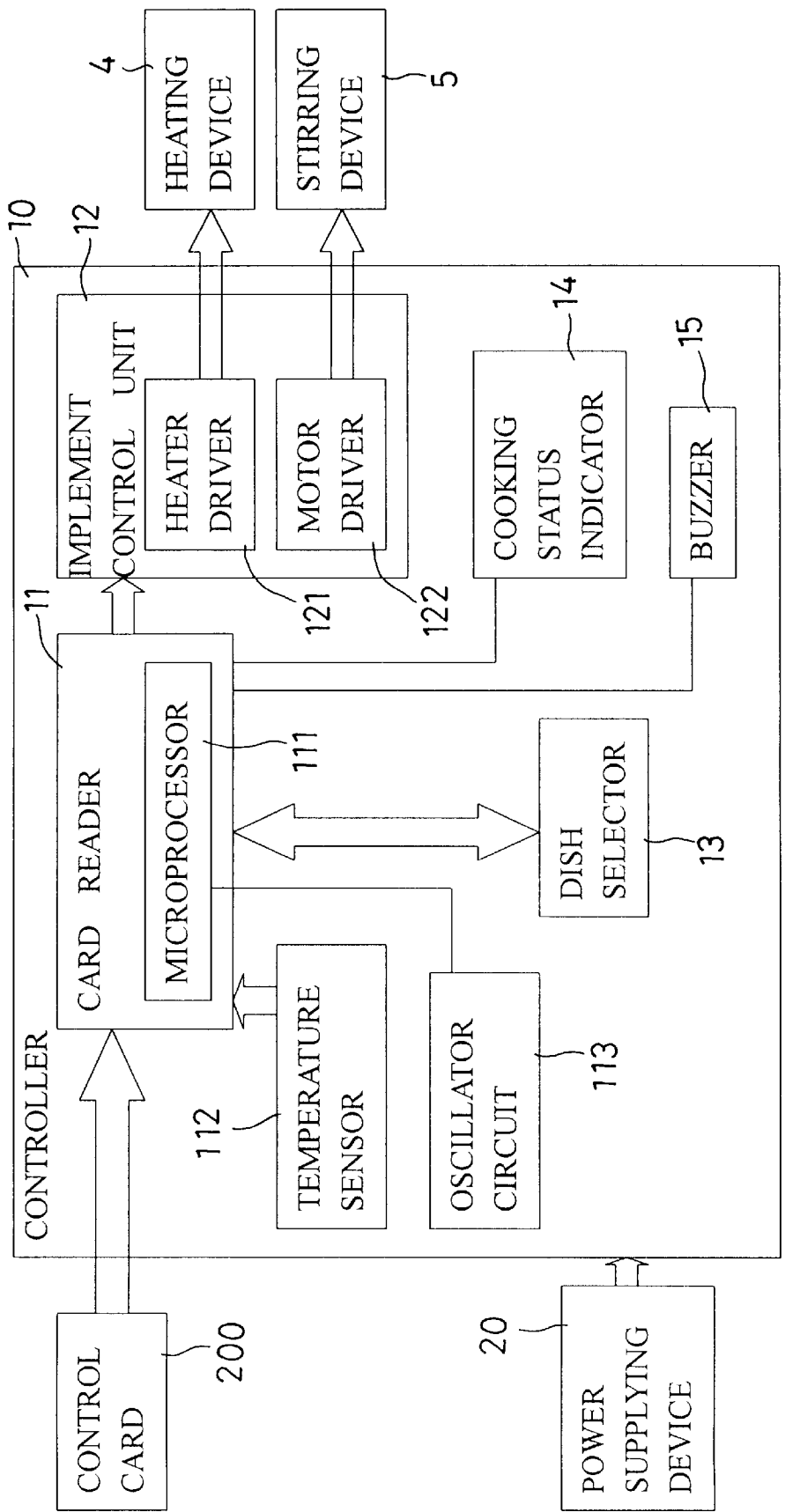
FIG. 3 is a schematic circuit block diagram of the preferred embodiment.

Referring to FIGS. 1, 2 and 3, the preferred embodiment of an automatic cooker according to the present invention is shown to comprise a housing 1, a cooking container 2 provided inside the housing 1 and adapted to receive raw food therein, and a thermal insulator 3 between the housing 1 and the cooking container 2. A cooking implement assembly is adapted to perform at least one cooking operation on the food in the cooking container 2. In this embodiment, the cooking implement assembly includes a heating device 4 mounted in the housing 1 between the cooking container 2 and the thermal insulator 3, and a stirring device 5 mounted in the housing 1 and extending into the cooking container 2 at a bottom side of the latter. The heating device 4 is adapted to heat the food in the cooking container 2. The stirring device 5 is adapted to stir the food in the cooking container 2.

The housing 1 is formed with a card slot 100 that is adapted for insertion of a control card 200. The control card 200 has automatic cooking data stored therein. In the preferred embodiment, the automatic cooking data include cooking time data, cooking temperature data, and stirring data. Preferably, the automatic cooking data include cooking data for a predetermined number of dishes. In this embodiment, the automatic cooking data for five different dishes are stored in the control card 200. The control card 200 can be an integrated circuit card, a punched card or similar cards suitable for data storage. The control card 200 is an integrated circuit card in the preferred embodiment.

A card-type controller 10 is mounted inside the housing 1 and is connected to the heating device 4 and the stirring device 5. The controller 10 is adapted to receive removably the control card 200 that is inserted from an exterior of the housing 1 via the card slot 100, and is adapted to read the automatic control data stored in the control card 200 so as to control operations of the heating device 4 and the stirring device 5 in accordance with the automatic cooking data read from the control card 200 in order to cook the food in the cooking container 2.

The controller 10 includes a card reader 11 and an implement control unit 12. The configuration of the card reader 11 depends on the type of the control card 200 that is in use. In this embodiment, the card reader 11 is an integrated circuit card reader, and is adapted to receive removably an edge portion 201 of the control card 200 so as to establish electrical connection therewith for reading the automatic cooking data stored in the control card 200. The card reader 11 has a microprocessor 111, and the implement control unit 12 includes a heater driver 121 interconnecting the card reader 11 and the heating device 4, and a motor driver 122 interconnecting the card reader 11 and the stirring device 5. The automatic cooking data read by the card reader 11 are processed by the microprocessor 111. The microprocessor 111 then activates the heater driver 121 and the motor driver 122 to control the operations of the heating device 4 and the stirring device 5 in accordance with the automatic cooking data read by the card reader 11. A temperature sensor 112 is connected to the card reader 11 and is mounted in the housing 1 to enable the microprocessor 111 to monitor the temperature of the cooking container 2. An oscillator circuit 113 provides the required clock pulse signals to the microprocessor 111.

The controller 10 additionally includes a dish selector 13 and a cooking status indicator 14 mounted on the housing 1 and connected to the card reader 11. As shown in FIG. 2, the dish selector includes a plurality of light indicators 131 and a select key 132 that is operated to select the cooking data of one of the dishes stored in the control card 200 and to be read by the card reader 11. The light indicators 131 correspond respectively to the automatic cooking data of the different dishes stored in the control card 200, and are activated when the corresponding automatic cooking data is selected. The cooking status indicator 14 is activated by the card reader 11 to emit light when cooking of the food in the cooking container 2 is initiated.

The controller 10 further includes a buzzer 15 connected to and activated by the card reader 11 to generate sound when cooking of the food in the cooking container 2 is completed. Electric power is supplied to the controller 10 by a known power supplying device 20.

Based on the cooking time data and the cooking temperature data of the dish that was selected with the use of the select key 132, the heating device 4 is controlled by the heater driver 121 so as to be adapted to heat the food in the cooking container 2 to predetermined heating temperatures during predetermined time periods. Based on the stirring data of the selected dish, the stirring device 5 is controlled by the motor driver 122 so as to be adapted to stir the food in the cooking container 2.

In the following example, when it is desired to cook red bean congee using the automatic cooker of this invention, appropriate amounts of red beans, rice grains and water are placed in the cooking container 2. Then, the appropriate control card 200 is inserted into the card slot 100 in the housing 1 so as to be received by the card reader 11. The dish selector 13 is subsequently operated to control the card reader 11 to read the automatic cooking data corresponding to red bean congee from the control card 200. Automatic cooking begins when a start/stop (ST/SP) key 133 (see FIG. 2) of the dish selector 13 is operated. At this time, the cooking status indicator 14 is activated by the card reader 11 to emit light, thereby indicating that cooking is initiated. Based on the cooking time data and the cooking temperature data for red bean congee, the heating device 4 is controlled by the heater driver 121 so as to heat the food in the cooking container 2 until it boils, to maintain the temperature in the cooking container 2 such that the food is kept boiling for about five more minutes, and to heat the food in the cooking container 2 to allow the latter to simmer for about one hour. At the same time, based on the stirring data for red been congee, the stirring device 5 is controlled by the motor driver 122 so as to stir the food in the cooking container 2 in order to mix the food evenly and to prevent the food from sticking to the bottom of the cooking container 2. Upon completion of the cooking operations, the buzzer 15 is activated to generate sound to alert the user that the food in the cooking container 2 is ready to be served.

It has thus been shown that the automatic cooker of this invention incorporates a card-type controller 10 for controlling cooking conditions, e.g. heating and stirring, according to automatic cooking data stored in a removable control card 200. Since the automatic cooking data are stored in the control card 200, which is removable to permit replacement with another one, the variety of dishes that can be cooked automatically using the automatic cooker of this invention is increased to enhance utility of the automatic cooker. Moreover, the automatic cooking data in the control card 200 can be programmed to suit individual tastes, thereby enabling the automatic cooker of this invention to serve dishes that suit the individual tastes of different users, rather than dishes of uniform tastes. The automatic cooker of this invention can be in the form of a microwave oven, an electric rice cooker, an electric stove, etc. Since the control card 200 is separate from the housing 1 of the automatic cooker, there is no need for the manufacturer to conduct numerous experiments to develop a wide variety of dishes that are to be programmed in the automatic cookers as taught in the prior art. Publishers of cookbooks and food suppliers may sell their goods with the control cards of this invention so that a larger number of dishes can be prepared automatically using the cooker of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An automatic cooker for cooking food according to automatic cooking data stored in a control card, comprising:

a cooking container adapted to receive raw food therein;

a cooking implement assembly adapted to perform at least one cooking operation on the food in said cooking container;

a housing formed with a card slot that is adapted for insertion of the control card; and a card-type controller mounted in said housing and connected to said cooking implement assembly, said controller being adapted to receive removably the control card that is inserted from an exterior of said housing via said card slot and being adapted to read the automatic cooking data stored in the control card so as to control operation of said cooking implement assembly in accordance with the automatic cooking data read from the control card in order to cook the food in said cooking container.

2. The automatic cooker as claimed in claim 1, wherein said controller includes:

a card reader adapted to receive removably the control card and to read the automatic cooking data stored in the control card; and an implement control unit connected to said card reader and said cooking implement assembly, said implement control unit controlling the operation of said cooking implement assembly in accordance with the automatic cooking data read by said card reader.

3. The automatic cooker as claimed in claim 2, the automatic cooking data including cooking time data and cooking temperature data, wherein said cooking implement assembly includes a heating device mounted to said housing, said heating device being connected to and controlled by said implement control unit so as to be adapted to heat the food in said cooking container to predetermined heating temperatures during predetermined time periods based on the cooking time data and the cooking temperature data read by said card reader.

4. The automatic cooker as claimed in claim 3, the automatic cooking data further including stirring data, wherein said cooking implement assembly further includes a stirring device mounted to said housing, said stirring device extending into said cooking container and being connected to and controlled by said implement control unit so as to be adapted to stir the food in said cooking container based on the stirring data read by said card reader.

5. The automatic cooker as claimed in claim 1, wherein said cooking container is provided inside said housing.

6. The automatic cooker as claimed in claim 5, further comprising a thermal insulator between said housing and said cooking container.

7. The automatic cooker as claimed in claim 2, the automatic cooking data stored in the control card including cooking data for a predetermined number of dishes, wherein said controller further includes a dish selector mounted on said housing and connected to said card reader, said dish selector being operable to select the cooking data of one of the dishes to be read by said card reader.

8. The automatic cooker as claimed in claim 2, wherein said controller further includes a cooking status indicator mounted on said housing and connected to and activated by said card reader to emit light when cooking of the food in said cooking container is initiated.

9. The automatic cooker as claimed in claim 2, wherein said controller further includes a buzzer connected to and activated by said card reader to generate sound when cooking of the food in said cooking container is completed.

10. An apparatus for controlling operation of an automatic cooker that includes a cooking container for receiving raw food therein, and a cooking implement assembly for performing at least one cooking operation on the food in the cooking container, said apparatus comprising:

at least one control card having automatic cooking data stored therein;

a housing formed with a card slot for insertion of said control card; and a card-type controller mounted in said housing to receive removably said control card that is inserted from an exterior of said housing via said card slot, said controller reading the automatic cooking data stored in said control card and being adapted to control operation of the cooking implement assembly in accordance with the automatic cooking data read from said control card in order to cook the food in the cooking container.

11. The apparatus as claimed in claim 10, wherein said controller includes:

a card reader for receiving removably said control card and for reading the automatic cooking data stored in said control card; and an implement control unit connected to said card reader and adapted to control the operation of the cooking implement assembly in accordance with the automatic cooking data read by said card reader.

12. The apparatus as claimed in claim 11, the cooking implement assembly including a heating device for heating the food in the cooking container, wherein the automatic cooking data include cooking time data and cooking temperature data to enable said implement control unit to control the heating device to heat the food in the cooking container to predetermined heating temperatures during predetermined time periods.

13. The apparatus as claimed in claim 12, the cooking implement assembly further including a stirring device that extends into the cooking container for stirring the food in the cooking container, wherein the automatic cooking data further include stirring data to enable said implement control unit to control stirring operation of the stirring device.

14. The apparatus as claimed in claim 13, wherein said housing is adapted for mounting the heating device and the stirring device thereto.

15. The apparatus as claimed in claim 14, wherein said housing is adapted to receive the cooking container therein.

16. The apparatus as claimed in claim 11, wherein the automatic cooking data stored in said control card include cooking data for a predetermined number of dishes, said controller further including a dish selector mounted on said housing and connected to said card reader, said dish selector being operable to select the cooking data of one of the dishes to be read by said card reader.

17. The apparatus as claimed in claim 11, wherein said controller further includes a cooking status indicator mounted on said housing and connected to and activated by said card reader to emit light when cooking of the food in the cooking container is initiated.

18. The apparatus as claimed in claim 11, wherein said controller further includes a buzzer connected to and activated by said card reader to generate sound when cooking of the food in the cooking container is completed.

* * * * *